United States Patent [19]

Yoshida

[11] Patent Number: 4,794,551
[45] Date of Patent: Dec. 27, 1988

[54] ROTATION SPEED DETECTING APPARATUS

[75] Inventor: Koichi Yoshida, Hyogo, Japan

[73] Assignee: Mitsubishi Denki Kabushiki Kaisha, Tokyo, Japan

[21] Appl. No.: 866,443

[22] Filed: May 23, 1986

[30] Foreign Application Priority Data

Oct. 4, 1985 [JP] Japan .................. 60-222257

[51] Int. Cl.⁴ .................. G01P 3/489; G01P 3/54; G06F 15/40
[52] U.S. Cl. .................. 364/565; 324/166; 377/20
[58] Field of Search .................. 324/166; 328/129.1, 328/130.1; 364/565; 377/20

[56] References Cited

U.S. PATENT DOCUMENTS

| | | | |
|---|---|---|---|
| 3,757,167 | 9/1973 | Yoshikawa et al. | 324/166 X |
| 4,229,695 | 10/1980 | Bassi | 324/166 |
| 4,281,388 | 7/1981 | Friend et al. | 324/166 X |
| 4,434,470 | 2/1984 | Thomas et al. | 364/565 |
| 4,485,452 | 11/1984 | Cording et al. | 324/166 X |
| 4,527,248 | 7/1985 | Takase et al. | 364/565 |
| 4,566,069 | 1/1986 | Hirayama et al. | 364/565 X |
| 4,584,528 | 4/1986 | Ohmae et al. | 324/166 |

FOREIGN PATENT DOCUMENTS 53-53776 5/1978 Japan .

Primary Examiner—Parshotam S. Lall
Assistant Examiner—Edward R. Cosimano
Attorney, Agent, or Firm—Bernard, Rothwell & Brown

[57] ABSTRACT

An apparatus for detecting the rotation speed of a rotatory member such as a rotary shaft of an electric motor comprises a first counter for counting the pulses of a pulse signal of a frequency proportional to the rotation speed of the rotatory member, a presettable down-counter for counting down a predetermined value sequentially in response to clock pulses, and a CPU for reading out the count value of the first counter upon completion of prescribed count-down of the presettable down-counter and computing the rotation speed of the rotatory member on the basis of the count value thus read out. And upon termination of such computation, the CPU changes the count value of the presettable down-counter back to the predetermined value.

2 Claims, 4 Drawing Sheets

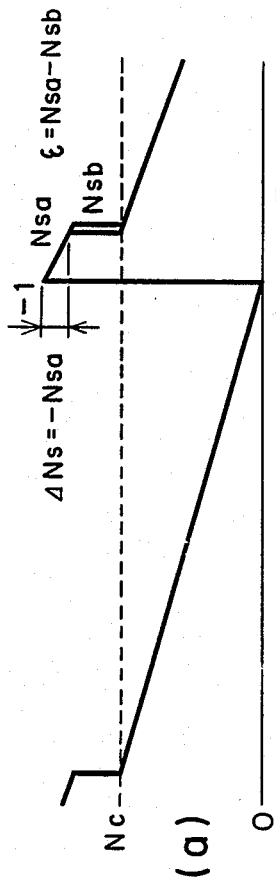
FIG. 2 (a)
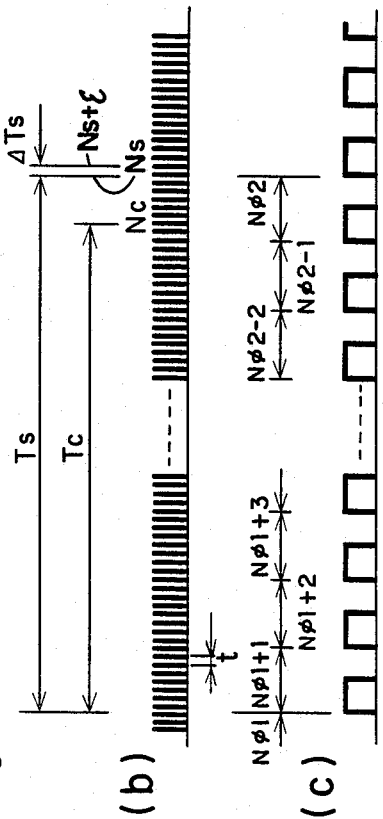
FIG. 2 (b)
FIG. 2 (c)

FIG. 4 (PRIOR ART)
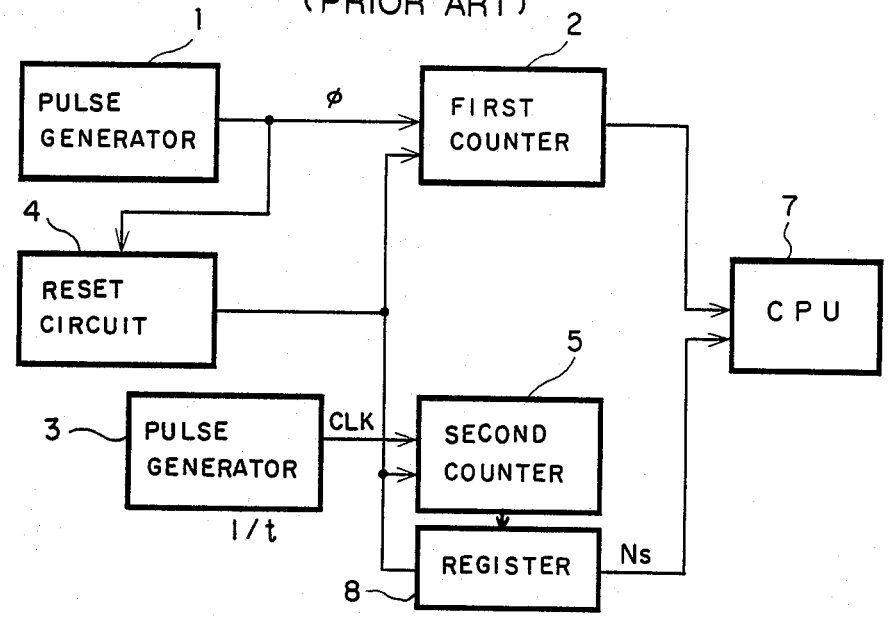
FIG. 5 (PRIOR ART)
FIG. 5 (a)
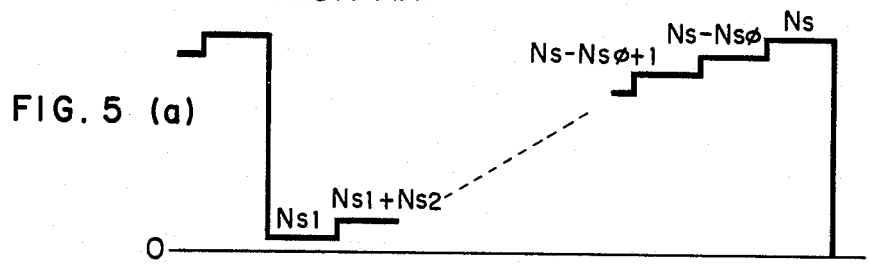
FIG. 5 (b)
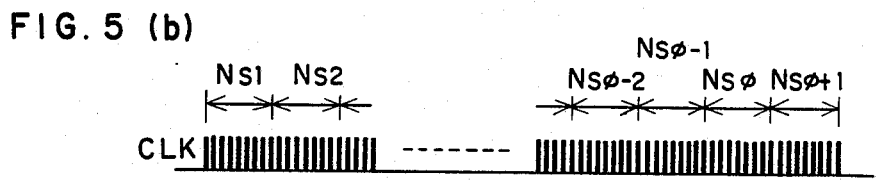
FIG. 5 (c)
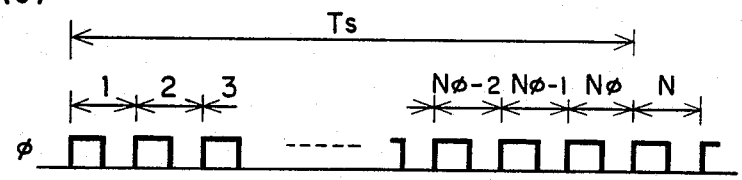

ROTATION SPEED DETECTING APPARATUS

BACKGROUND OF THE INVENTION

1. Field of the Invention

The present invention relates to an apparatus for detecting the rotation speed of a rotatory body or member such as a rotary shaft of an electric motor.

The speed detecting apparatus according to the invention is usually incorporated in a speed control system to constitute, for example, a motor speed change arrangement such as thyristor Leonard equipment in a steel plant or the like.

2. Description of the Prior Art

FIG. 3 is a block diagram of a control system relative to a conventional speed detecting apparatus, in which there are shown a DC motor 11, an apparatus 12 for detecting the rotation speed of the DC motor 11, and a speed controller 13 for producing a reference current which corresponds to the difference between a set speed and the actual speed detected by the apparatus 12. Further shown are a three-phase AC source 14, a power rectifier 15 for converting a three-phase AC into a variable DC voltage, a current sensor 16 for sensing the current value supplied to the power rectifier 15, a current controller 17 for providing data to adjust the output voltage of the power rectifier 15 in accordance with the difference between the actual current obtained from the current sensor 16 and the reference current produced from the speed controller 13, and a gate control circuit 18 for controlling switching elements such as thyristors of the power rectifier 15 in conformity with the data from the current controller 17. The rotation speed of the DC motor 11 is controlled by changing the voltage applied thereto. The power rectifier 15 is assumed to be capable of selectively functioning in a positive voltage output mode or a negative voltage output mode in accordance with the reference current outputted from the speed controller 13.

In the constitution mentioned above, the following operation is performed. Generally the control response in such circuit configuration is enhanced as the sampling time for speed detection is shortened. However, due to the play existing inevitably in any mechanism such as gears, great pulsation is induced in the speed to be detected when the sampling time is short, and therefore the reference current value obtained from the speed controller 13 also pulsates to a considerable extent. In case the load is light to consequently require generation of a small torque, the mean current value is small so that there occurs a state where the reference current pulsates between a positive value and a negative value as a result of the speed pulsation. Accordingly, the power rectifier 15 comes to be frequently switched for generation of a positive voltage or a negative voltage, and the control system is rendered unstable by such wasteful switching time and so forth.

Meanwhile, if the sampling time is prolonged, momentary great pulsation is absorbed in the mean value to eventually reduce the variation in the speed to be detected, whereby the control system is stabilized. Practically, however, a great torque is required when a load is applied to the motor as in rolling, hence increasing the mean current as a result. And the current pulsation is reduced relatively to the mean current to become almost negligible. It is necessary, therefore, to enhance the response characteristic by setting a short sampling time in such a state.

As is apparent from the above description, the sampling time needs to be changed in conformity with the load for attaining a high stability in the full operation range.

There is known a conventional speed detecting apparatus of the above-mentioned type for use in a speed change system, as disclosed in Japanese Utility Model Publication No. 53-53776. FIG. 4 is its block circuit diagram, and FIGS. 5(a), 5(b) and 5(c) show timing charts of signals for explaining the circuit operation, wherein a train of pulses $\phi$ of a frequency proportional to the speed are produced from a pulse generator 1 and are fed to a first counter 2 to be counted, as shown in FIG. 5(c). Meanwhile a train of clock pulses CLK of a fixed frequency obtained from another pulse generator 3 are inputted to a second counter 5 to be counted, as shown in FIG. 5(d). And upon arrival of each speed pulse $\phi$ from the pulse generator 1, the reset circuit 4 operates to input the count value of the second counter 5 to a register 8 and to reset the counters 2 and 5. That is, when Ns1 clock pulses CLK outputted from the pulse generator 3 arrive during the first speed pulse $\phi$ Ns1 clock pulses are stored in the register 8, then Ns2 clock pulses are stored during the next speed pulse $\phi$, and subsequently Ns3 clock pulses are stored in sequence. Accordingly, the sum Ns of the count values of the second counter 5 stored in the register 8 during the count time of the first counter 2 from zero to N$\phi$ is expressed as $Ns = Ns1 + Ns2 + \ldots + Ns\phi$, as shown in FIG. 5(a).

Therefore the number N of rotations is a value proportional to the number of speed pulses produced from the pulse generator 1 during a unit time, and it is expressed as $$N = Ka \frac{N\phi}{Ts} \quad (1)$$

$$= Kb \frac{N\phi}{Ns} \quad (2)$$

Thus, the rotation speed N can be obtained through computation of Eq. (2) by inputting the content values N$\phi$ and Ns of the register 8 to a CPU 7, where Ka and Kb are proportional constants, and Ts is a speed measurement time corresponding to a sampling period for speed detection.

In the conventional speed detecting apparatus where the speed is determined by the number of clock pulses CLK inputted during the unit time of one pulse $\phi$, there exists a disadvantage that when the duration of one pulse $\phi$ is long to represent a low speed, the number Ns$\phi$ of clock pulses CLK per pulse $\phi$ becomes sufficiently large so that the error is small, but in case the duration of one pulse $\phi$ is short to represent a high speed, the number Ns1 of clock pulses CLK per pulse $\phi$ becomes small to eventually cause increase of the error. Accordingly the error induced in the sum Ns of Ns1, Ns2 . . . and so forth also increases at a high speed. Furthermore, when N$\phi$ is kept fixed, the sampling time Ts changes merely depending on the period of the signal $\phi$ which corresponds to the speed, and it is impossible to establish the sampling time Ts from the CPU 7 independently of the signal $\phi$. In the circuit configuration where Ts can be controlled with N$\phi$ variable in accordance with $\phi$, a comparator becomes necessary for comparing the count value of the first counter 2 with a set value $N\phi$, hence increasing the number of component elements to eventually render the configuration complicated.

SUMMARY OF THE INVENTION

It is an object of the present invention to provide a rotation speed detecting apparatus which is capable of outputting a speed detection value with a high precision regardless of whether the rotation speed of a rotatory member is high or low.

And another object of the invention resides in providing a rotation speed detecting apparatus of a simplified structure.

In an exemplary embodiment of the present invention, the apparatus for detecting the rotation speed of a rotatory member comprises a pulse generator for generating a pulse signal of a frequency proportional to the rotation speed of the rotator; a first counter for counting the pulses of the said pulse signal; a second pulse generator for generating a clock signal of a fixed frequency; a presettable counter for down-counting a predetermined value in response to each pulse of the input clock signal and outputting a borrow signal upon reduction of the down-count value thereof to a certain value; and a CPU for computing the rotation speed of the rotatory member on the basis of the count value of the first counter obtained during the sampling time from the down-count start point of the presettable counter to its output of the borrow signal and, after terminating such computation, outputting a preset signal to establish the count value of the presettable down-counter at the predetermined value.

BRIEF DESCRIPTION OF THE DRAWINGS

FIGS. 2(a), 2(b) and 2(c) are timing charts of various signals produced in the apparatus shown in FIG. 1;

FIG. 4 is a block diagram of a conventional rotation speed detecting apparatus; and FIGS. 5(a), 5(b) and 5(c) are timing charts of various signals produced in the apparatus of FIG. 4.

DETAILED DESCRIPTION OF THE PREFERRED EMBODIMENT

Figure 1:
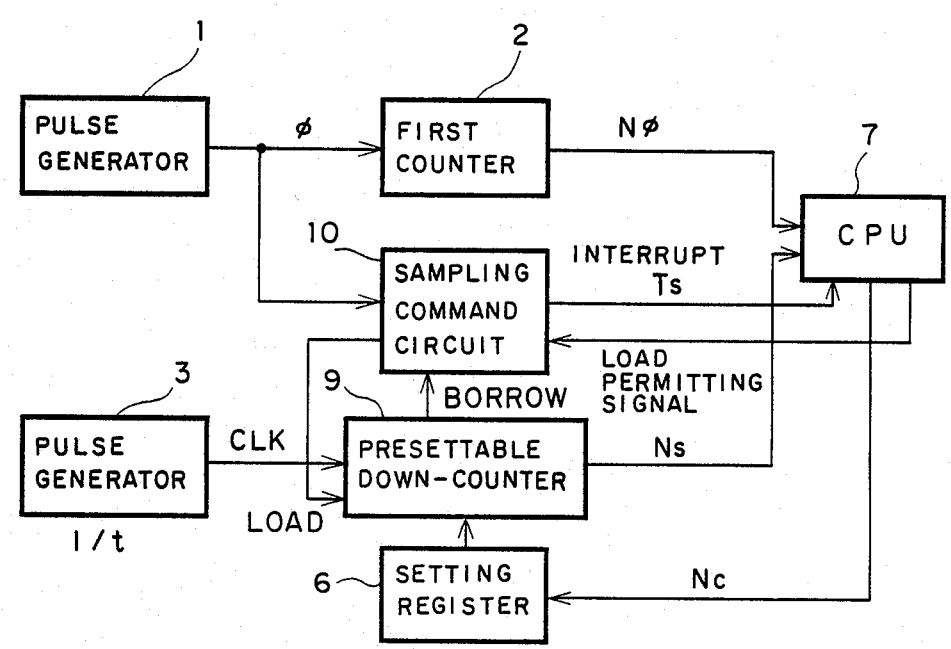
FIG. 1 is a block diagram of an apparatus for detecting the rotation speed of a rotatory member according to the present invention.
Figure 3:
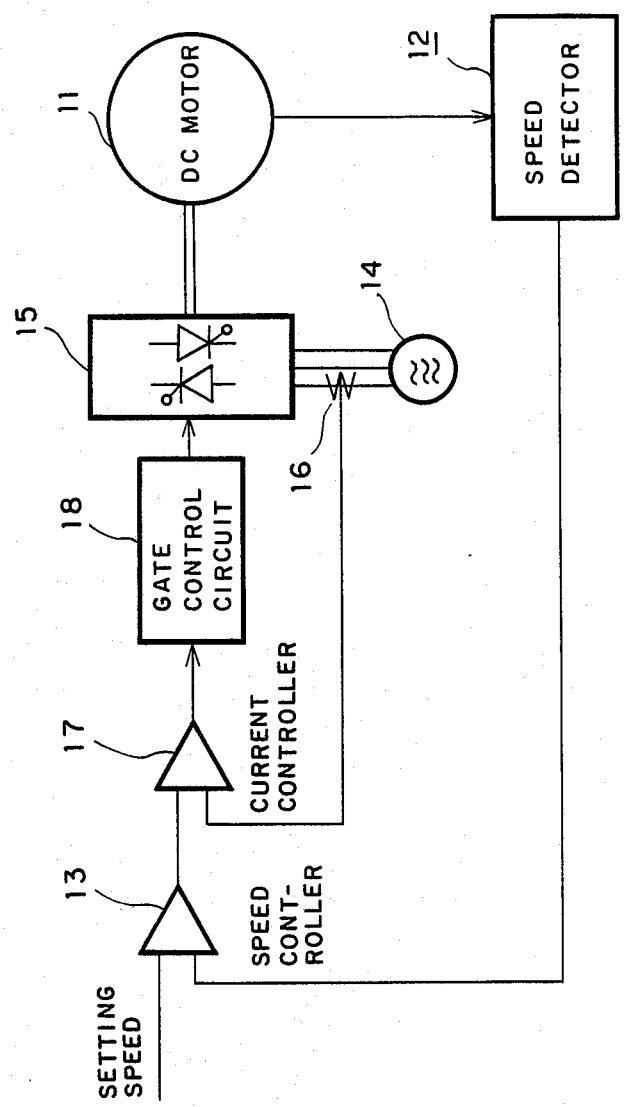
FIG. 3 is a known rotation speed control system where the apparatus of this invention is employed.

In FIG. 1 showing the rotation speed detecting apparatus of the present invention, a pulse generator 1, a first counter 2, a pulse generator 3 and a CPU 7 are functionally the same as those represented by like reference numerals in FIG. 4. In addition thereto, the apparatus of this invention further comprises a setting register 6, a presettable down-counter 9 and a sampling command circuit 10.

In its operation, first the pulse generator 1 generates output pulses $\phi$ of a frequency proportional to the speed, and such pulses are fed to and counted by the first counter (up-counter) 2 as shown in FIG. 2(c). Meanwhile, clock pulses CLK of a frequency 1/t generated from the pulse generator 3 are inputted to the presettable down-counter 9 and are counted therein. When fed with a load signal outputted from the sampling command circuit 10, the presettable counter 9 presets its count value at Nc established in the setting register 6. And in conformity with the clock pulses CLK received from the pulse generator 3, the presettable down-counter 9 counts down from the value Nc and, upon its reduction to zero, outputs a borrow signal to the sampling command circuit 10. Subsequently the presettable down-counter 9 counts down to $-1$, $-2$, $-3$ ... and so forth in response to arrival of clock pulses CLK.

FIGS. 2(a), 2(b) and 2(c) are timing charts of signals showing how speed detection is performed in the apparatus of FIG. 1. When a load signal is fed from the sampling command circuit 10 to the presettable down-counter 9, the count value of the presettable down-counter 9 becomes equal to the value Nc stored in the setting register 6. Supposing that the count value of the first counter 2 is $N\phi 1$ at this moment, the presettable down-counter 9 counts down sequentially according to incoming clock pulses CLK. And the sampling time Ts ends at the rise of the next speed pulse $\phi$, applied from the pulse generator 1 to sampling command circuit 10, after the borrow signal produced after reduction of the count value to zero.

Therefore, the time Tc required for the count value of the presettable counter 9 to reach zero from Nc is given by $$Tc = Nct \qquad (3)$$

so that $Ts \geq Tc$. When the speed is low, the sampling time Ts becomes almost infinite, but in a normal state where more than one speed pulse $\phi$ are generated during the sampling set time Tc, the speed pulse $\phi$ comes to rise prior to the lapse of at latest another time Tc after the preceding Tc. Accordingly, in a normal operation, $$2Tc \geq Ts \geq Tc \qquad (4)$$

and thus Ts is limited by Tc.

Consequently it becomes possible to control Ts by varying Nc which determines Tc. The value NC is preset in register 6 by CPU 7 and can be changed by the CPU 7 to different values.

Upon termination of the sampling time Ts, an interrupt signal is applied from the sampling command circuit 10 to the CPU 7. And in response to the interrupt signal, the CPU 7 is so commanded as to receive the respective count value $N\phi 2$ and Nsa of the first counter 2 and the presettable down-counter 9. After reading the values $N\phi 2$ and Nsa, the CPU 7 applies a load permitting signal to the sample command circuit 10 to enable the sample command circuit to generate a load signal which is outputted to the presettable down-counter 9 at the rise of the next pulse from the pulse generator 1 to begin the next sampling period Tc. The number $\Delta Ns$ of clock pulses CLK generated during the time Ts$-$Tc is equal to $-$Nsa, and the number Ns of clock pulses CLK generated during the actual sampling time is given by $$Ns = Nc + \Delta Ns = Nc - Nsa \qquad (5)$$

Meanwhile, the number $N\phi$ of speed pulses $\phi$ generated during the time Ts is obtained as follows:

$$N\phi = N\phi 2 - N\phi 1 \qquad (6)$$

Substituting the above value with Eq. (2), the rotation speed N is expressed as $$N = Kb \frac{N\phi 2 - N\phi 1}{Nc - Nsa} \quad (7)$$

It follows, therefore, that the presettable down-counter 9 has a function of counting the clock pulses CLK fed from the pulse generator 3 and also another function of measuring the sampling set time Tc to determine the sampling time Ts. Consequently no comparator is required for comparing the count value of the presettable down-counter 9 with the value Nc. Since the CPU 7 is capable of acquiring the count values N$\phi$ and Ns in response to an interrupt signal applied thereto, no register is necessary either to store the values N$\phi$ and Ns. Strictly speaking, there exists a time difference $\Delta$Ts between termination of the sampling time Ts and input of the count values to the CPU 7 after application of the interrupt signal. However, no problem arises when the generation periods of speed pulses $\phi$ and clock pulses CLK are sufficiently longer than the time difference $\Delta$Ts. With the exception of special cases, the generation period of speed pulses $\phi$ is sufficiently longer than the time difference $\Delta$Ts but that of clock pulses CLK is substantially equal to or shorter than $\Delta$Ts.

Accordingly, although the actual number of clock pulses CLK generated during the sampling time Ts is Ns, the value inputted to the CPU 7 is Nsb (FIG. 2(a)) which is equal to Ns+$\epsilon$ as shown in FIG. 2(b). However, since the time difference $\Delta$Ts resulting from the occurrence of $\epsilon$ is established in the stage of preparing a program, the number $\epsilon$ of pulses generated during $\Delta$Ts of the clock pulses CLK of a predetermined period is a certain fixed value. Thus, an exact value Ns is obtainable with facility through a compensation executed by always subtracting the fixed value $\epsilon$ from the value Ns+$\epsilon$ inputted to the CPU 7.

In the present invention, the speed is computed from two factors consisting of the number N$\phi$ of speed pulses $\phi$ and the number Ns of clock pulses CLK generated during the sampling time Ts which is substantially constant in the range of 2Tc$\geq$Ts$\geq$Tc, so that the speed detection can be performed with a high precision regardless of whether the speed is high or low.

In the above embodiment, the operation has been so explained that when the count value of the presettable down-counter 9 reaches zero, the count advances as $-1, -2 \ldots$ and so forth in accordance with incoming pulses. However, the presettable down-counter 9 may be so formed that upon reduction of its count value to zero, a load value Nc is loaded automatically in the counter 9 again and, after replacement of the count value with Nc, the count advances as Nc$-1$, Nc$-2$ $\ldots$ and so forth in accordance with incoming pulses. In this case, the count value Nsc of the presettable down-counter 9 at the termination of the sampling time Ts is given by $$Ns = Nc - Nsc \quad (8)$$

so that Ns can be obtained as $$Ns = Nc + Nc - Nsc \quad (9)$$

The first counter 2 used in the embodiment is of up-count type, and the number of speed pulses $\phi$ is obtained as N$\phi$=N$\phi$2+N$\phi$1 under the condition that N$\phi$1 is smaller than N$\phi$2. However, the first counter 2 may be of down-count type as well. In this case, N$\phi$1 is greater than N$\phi$2, and the number of speed pulses $\phi$ is obtained as N$\phi$=N$\phi$1$-$N$\phi$2.

For the purpose of varying the sampling time Ts, the setting register 6 is employed to establish Nc from the CPU 7 in a real time operation. But in any system where Ts need not be varied, the setting register 6 is not required, simplifying the apparatus structure.

If the speed detecting apparatus is equipped with a mechanism to generate pulses of a frequency proportional to the speed to be detected, it becomes capable of detecting the speed of a rectilinear motion as well as that of a rotator.

In the present invention, as described hereinabove, a presettable down-counter is employed for counting the number Ns of clock pulses CLK, and data N$\phi$ and Ns can be inputted to a CPU by interruption. Accordingly an effective control function is additionally furnished for varying the sampling time Ts. Furthermore, neither a comparator nor a register for storing the count values Ns and N$\phi$ is required. Consequently cost reduction is achieved while realizing a simplified structure and a high precision.

What is claimed is:

1. An apparatus for detecting the rotation speed of a rotatory member, comprising:
    a first pulse generator for generating a pulse signal of a frequency proportional to the rotation speed of said rotatory member;
    a first counter for counting the pulses of said pulse signal from said first pulse generator;
    a second pulse generator for generating a clock signal of a fixed frequency;
    a presettable down-counter connected to the second pulse generator for counting down a predetermined value sequentially in response to each pulse of said clock signal fed thereto and outputting a borrow signal upon reduction of the count value thereof to a certain value;
    a CPU connected to the outputs of said first counter and said presettable down-counter to produce an output signal representing the rotational speed;
    a sampling command circuit which receives the borrow signal from said presettable down-counter and the pulse signal from said pulse generator and produces an interrupt signal representative of termination of a sampling time to be fed to said CPU, and feeds a load signal to said presettable down-counter upon receipt of a load permit signal from said CPU; and
    a setting register to specify, in response to said load signal, said predetermined value in said presettable down-counter;
    said CPU computing the rotation speed of said rotatory member using the count value in said first counter up to the receipt of said interrupt signal and outputting said load permit signal to allow said presettable down-counter to be preset at said predetermined value.

2. The apparatus according to claim 1 wherein said predetermined value specified by said setting register can be changed by the CPU to different values.

* * * * *

UNITED STATES PATENT AND TRADEMARK OFFICE
CERTIFICATE OF CORRECTION

PATENT NO. : 4,794,551

DATED : December 27, 1988

INVENTOR(S) : Koichi Yoshida

It is certified that error appears in the above-identified patent and that said Letters Patent is hereby corrected as shown below:

Column 5, line 66, "+" should be -- - --.

Column 6, line 47, after "said" insert the word --first--.

Signed and Sealed this

Seventh Day of November, 1989

*Attest:*

JEFFREY M. SAMUELS

*Attesting Officer*   *Acting Commissioner of Patents and Trademarks*